Dec. 2, 1941.　　　R. J. GAVIN ET AL　　　2,264,837
AUTOMATIC COFFEE MAKING MECHANISM
Filed Dec. 7, 1939　　　2 Sheets-Sheet 1
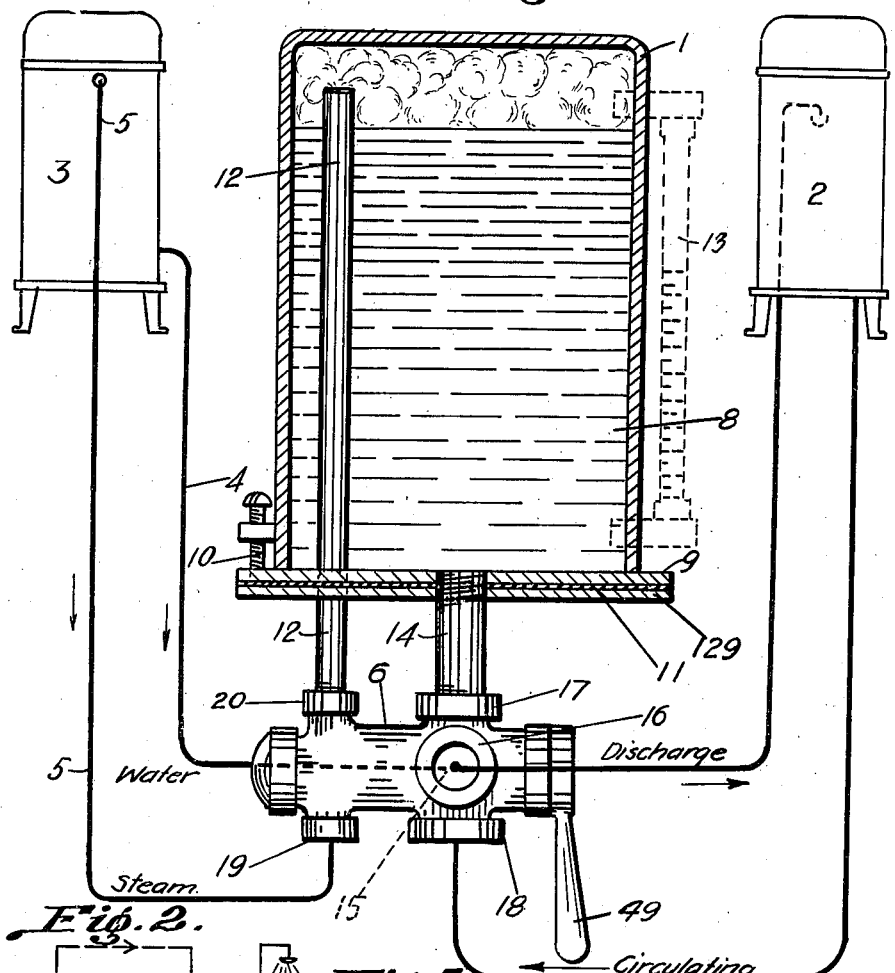
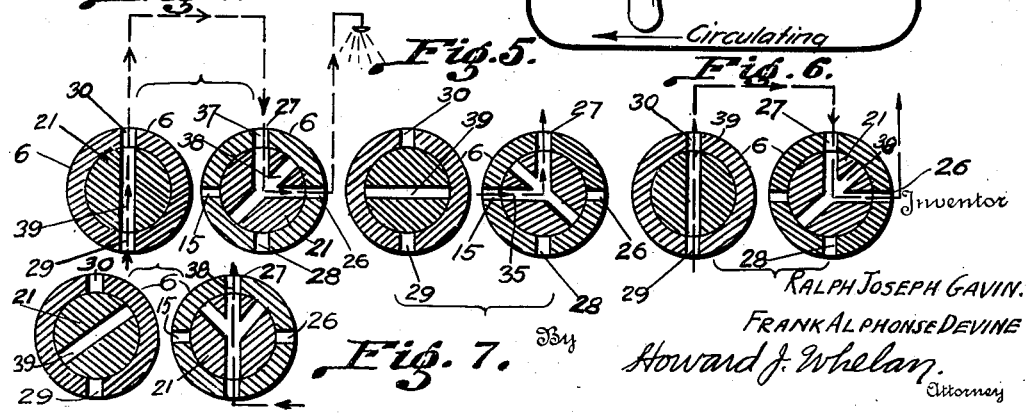

Dec. 2, 1941.  R. J. GAVIN ET AL  2,264,837
AUTOMATIC COFFEE MAKING MECHANISM
Filed Dec. 7, 1939  2 Sheets-Sheet 2
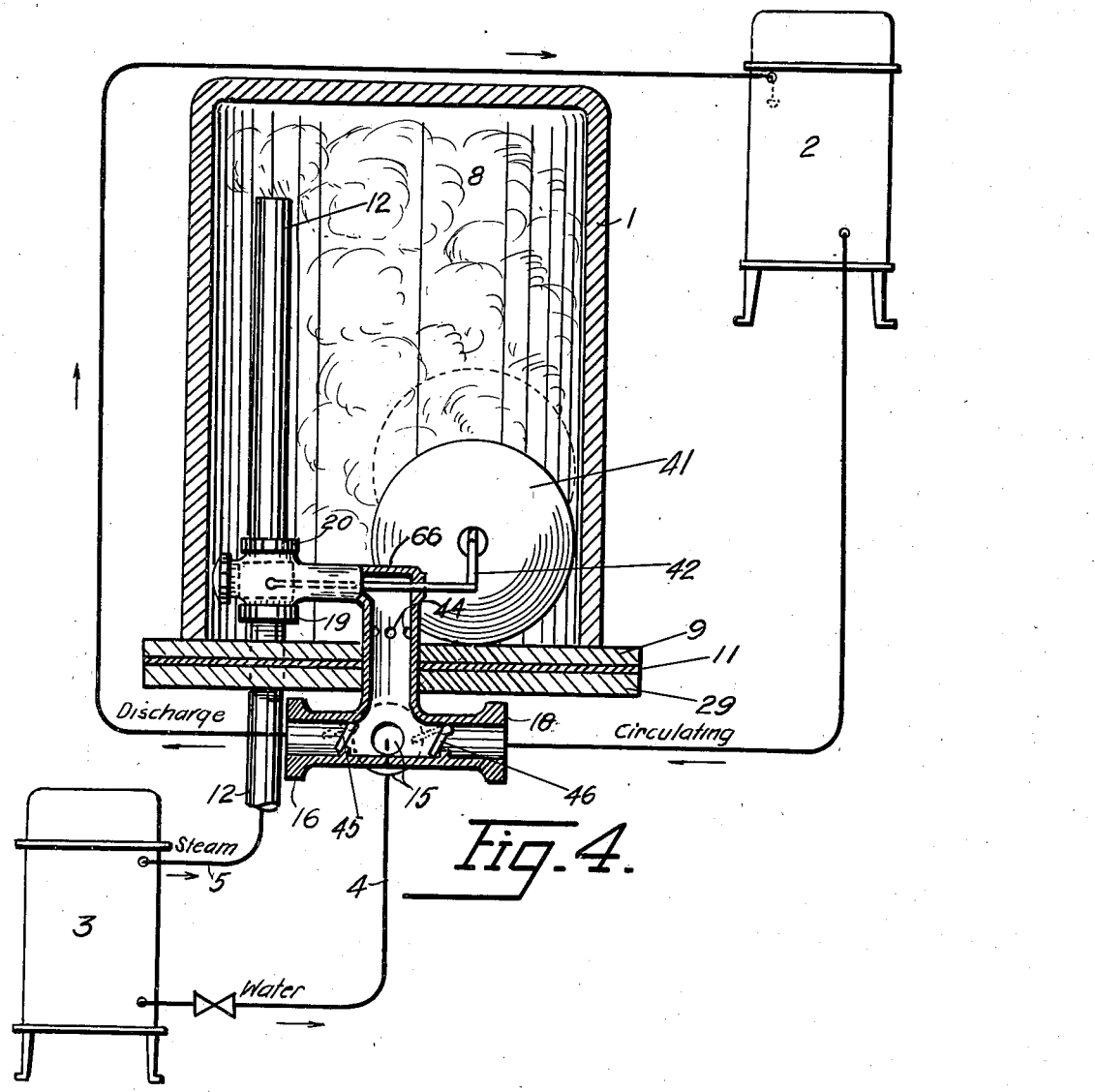
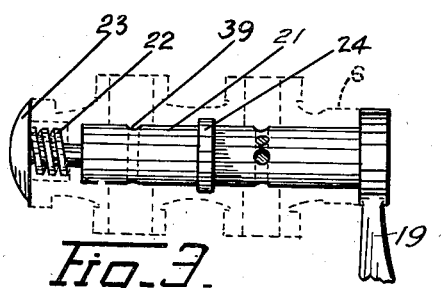
Inventor
RALPH JOSEPH GAVIN.
FRANK ALPHONSE DEVINE.
By Howard J. Whelan.
Attorney Patented Dec. 2, 1941

2,264,837

UNITED STATES PATENT OFFICE 2,264,837

AUTOMATIC COFFEE MAKING MECHANISM

Ralph Joseph Gavin and Frank Alphonse Devine, Philadelphia, Pa.

Application December 7, 1939, Serial No. 308,072

2 Claims. (Cl. 53—3)

This invention refers to beverage equipment and systems and more particularly to the making of coffee infusions and mixtures and the like. It has among its objects to eliminate the usual hand methods of pouring water on the coffee grounds to get the predetermined or desired color and taste in the beverage. This latter is usually termed its strength. It also has an object to provide for the automatic operation of the system to continue the repourings until the coffee is made to suit the users. Another object is to avoid all the difficulties and uncertainties of hand pouring and prevent the dangers incident thereto. A further object is to avoid the use of complicated mechanism and pumps for the propelling of the liquids through the system for extracting the essences from the coffee. Also to provide an arrangement that will permit the accurate measuring of the liquids used in the process to be accurately gauged and apportioned, and to have a valve arrangement that will permit the interconnection of piping and orifices for the operation of the system in a most facile and positive manner.

Other objects will become apparent as the invention is more fully set forth.

In the conventional manner of making coffee beverage on a commercial scale, such as in a restaurant, the process consists generally of pouring and repouring water by hand over the ground coffee in a basket in the top of the urn. The opening through which the water is poured is generally above the head of the operator and is done under considerable difficulty and danger. The quantities of water used are not measured with any approved degree of carefulness, are not under accurate control and are not poured in a very desirable manner. They flood through the grounds and may or may not absorb the essence of the coffee properly. In this invention, the turns for making the coffee are arranged with an extra magazine or reservoir adapted to hold water and to promote the action of making the beverage and to provide a valve arrangement that will facilitate the process. The magazine or reservoir acts in conjunction with the steam urn and the coffee urn and operates under an intermittent action of steam and vacuum together with the manipulation of a specially designed valve acting in conjunction with a float, or without as the case may be. All this is done to fill the magazine or reservoir with a measured amount of water; to propel same into the coffee urn (or whatever the beverage is) and infuse the essence in same and intermix it with the liquid. The valve device shuts off automatically as the accurately measured supply of water is taken from the magazine and the latter again filled with another measured quantity of water, and in turn, that is sent into the coffee urn assisted by steam pressure. After the proper quantity of water is placed in the coffee urn, the valves are changed in position to operate in a circulating manner for the continuous pouring or circulating of the water over the coffee grounds. Water is drawn back into the magazine after the latter is heated by steam and its air expelled; the cooling of the steam creates a vacuum and sucks the water in.

In the drawings which illustrate an example of this invention:

Figure 1 is a view in elevation partly in section of a water magazine and valve with attaching equipment shown diagrammatically to indicate the general operation of the system employed in this invention;

Figure 2 indicates a sectional view of the valve in diagrammatic form placed with its passages and parts in the position to allow the passage of steam therethrough;

Figure 3 is a detail view of the stem of the valve arrangement used in Figure 1, dotted lines being used to indicate the general outline of the valve body;

Figure 4 is a sectional elevation of a modified form of water magazine and valve device together with a diagrammatic outline of the attachment equipment used in connection therewith in this system;

Figure 5 indicates a sectional view of the valve in a position, arranged to permit the flow of water through it;

Figure 6 is a view similar to that of Figure 2 showing the position of the valve to force the water out of the magazine through the use of steam; and Figure 7 is a sectional view with the valve parts arranged in position to allow for recirculation of coffee through the same to the magazine.

Similar reference characters refer to similar parts throughout the drawings.

In the drawings, the reference character 1, represents a magazine for the measuring of fluids therein, and in this instance, is particularly intended for water to be used in making the beverage, such as coffee in an urn 2. The water is brought from another urn 3, spaced apart therefrom. This urn 3, supplies the water and steam required for making the coffee or other beverage through the interconnecting piping 4 and 5. The piping 4 supplies the water, and the piping 5, the steam. The magazine serves as the measuring equipment for the water and steam, and is so arranged in series with the piping as to control the same going through it, and has a controlling valve 6 attached. For convenience in indicating the connections, the magazine is shown spaced away from the valve and separate therefrom with the pipe nipples 12 and 14 connecting them together.

The control or diversion valve indicated in the drawings, consists of a body having a cylindrical passage longitudinally therethrough with orifice passages 15, 26, 27, 28, 29 and 30 leading from it and connected with the piping 4, 5, 12, 14, as generally indicated in the Figure 1. All connections are screw threaded as shown at 55 for water orifice 15; at 16 for return discharge orifice 26; at 17 for outlet orifice 27; at 18 for circulating orifice 18; and at the other portion of the valve control the connection 20 for the steam outlet orifice 30; and at 19 for the inlet steam orifice 29.

The valve stem is provided with cross passages 35, 38 and 39 to interconnect the orifices as indicated in Figures 2, 5, 6, and 7. The alignment of these passages with the orifices in their respective predetermined positions provides for the functioning of the equipment in the desired manner. The handle 49 is provided for the manipulation of the stem, while the screw 23 and spring 22 serve to provide a resilient pressure that prevents leakage and keeps the parts properly positioned in regard to each other. A ring washer 24 located in a groove in the stem 21 is compressed into the groove during assembly and travel through the passage in the body until it reaches a groove provided in the internal surface of the body, where it expands sufficiently to lock the stem and body together, without preventing the rotation of the stem during manipulation.

The magazine 1, is preferably of the form indicated in the drawings, being hollow and of cylindrical design. It has a bottom plate or flange 9, a cover 129, with a gasket 11 provided in between. The screws 10 are provided to give all necessary adjustments of these parts. A gauge 13 is mounted at the side of the magazine for indicating the amount of water present in it. A tube 12 extends into the magazine to a predetermined height. Urns 2 and 3 are indicated diagrammatically to illustrate the method of operation of the device together with the piping 4, 5 and for discharge and circulation, and connections 12 and 14.

The operation of the device may be followed in Figures 2, 5, 6 and 7. The fact that Figures 2 and 6 look alike, and the valve is positioned in a similar way, in both instances is not assumed as presenting a similar function in the use of the equipment. The sequence of operation requires that both figures be shown to make the operation clearer. This operation is as follows:

(1) The valve is turned to bring the orifices and passages into the alignment indicated in Figure 2. The magazine is assumed to be empty because the use of the equipment is just beginning. With the valve open as shown in Figure 2, the steam runs through the orifice 29, through the passage 39, through orifice 30 and pipe 12 into the magazine, which it heats, and continues, passing out of the magazine through the orifice 27, through the orifice 26 into the urn 2, where it condenses and accumulates, and the same time has taken a considerable part of the air out of the magazine.

(2) The valve is then turned to position indicated in Figure 5, shutting off the steam and opening the water orifice, the heated magazine creates a vacuum and draws in the water and fills the magazine. When the magazine is filled the valve is turned off, and then opened up.

(3) The next position of the valve appears to be the same as that indicated in Figure 2, but the steam flowing into the magazine is obstructed by the water filling it. The steam therefore forces all of the water out of the magazine into the urn 2.

(4) The valve is then turned to the position indicated in Figure 7, which allows the coffee or water infusion to flow out of the urn 2, back through the orifices indicated, under gravity or by the vacuum created by the steam condensing, into the magazine. The valve is then turned to its original first position, allowing the steam to force the infusion back into the urn 2 and flow over the coffee grounds again. This is repeated as often as is necessary. The valve is then turned to an "off" position, until needed again. This can be done by turning the valve stem a little to either side indicated of the position shown in Figure 2.

In the modified form of construction indicated in Figure 4, the valve structure is made differently to permit the use of a float 41 with its mechanism 42 for turning the steam portion of the valve, the water portion of the valve is provided with self closing gates 45 and 46 to cooperate in the manner of operation used in the original form. The float is raised with the filling of the magazine and closes off the steam valve so no steam will pass through the tube for the time being. The emptying of the magazine allows the float to lower and reopen the water or circulating ports of the valve, position C. The water flows into the magazine and fills it up raising the float, and this in turn opens the steam valve and the discharge to urn 2. The water flows out under gravity and the pressure of steam, opens self closing gate 45 and forces 46 closed as long as the pressure is exerted. Afterwards the float drops and closes the steam valve. The steam filling the magazine cools off, and condensation causes a vacuum pull to be exerted on the valve and selfclosing gates, 45 and 46. The valve 45 is pulled tight by the vacuum, but the gate 46 is opened and permits the water from the urn 2, to flow into the magazine and fill it. The movement is similar to that of positions A, B, C and D, in Figure 2. The various positions of the valve in Figure 2, are simply used to illustrate the principles of the invention. Position A shows the normal position of the valve parts when the magazine is warming up. The steam is driving through the magazine and sending out the air from within it and heating the container above the surrounding environment, in this instance. The position B follows A and allows the fresh hot water from the water supply to enter under its own pressure and that of the vacuum created in the magazine as the steam condenses, and during which the steam is cut off from the magazine. When full, the steam is opened by the valve assuming the position C during which the steam pressure is used to force the water through the outlet and discharge to the urn 2 where it sprinkles the coffee; after which the valve is placed in position D to allow the circulating coffee water to pass from the urn to the magazine under the suction created by the vacuum, and the operation is repeated. The markings or indicia on the gauge or magazine indicate the amount of water in the same at any particular moment, and thus enable the observer to operate the device accordingly. The various positions A, B, C, and D are formed on the valve 6 to facilitate the operator in the work. In Figure 4, similar reference characters are used on the orifice connections to facilitate their recognition with corresponding positions in the original form of diversion valve body. The drain holes 44 provide an arrangement for the liquids to drain into the valve body 66 from the magazine 1. In Figure 3, the stem 6, is shown with the passages through it, and the pin 23 and spring 22 for keeping it resiliently tight, as well as the partition members 24 to keep it in place.

While but two forms of the invention are shown in the drawings, it is not desired to limit this application for patent to such forms or in any other way, as it is appreciated that other structures could be made that would use the same principles and come within the scope of the appended claims.

Having thus described the invention, what is claimed is:

1. A measuring unit of the class described comprising in combination, a magazine body of hollow construction with outlet and inlet openings therein; a valve body attached to the magazine having a plurality of orifices aligning with said openings and in connection therewith, and other orifices for connection to the steam, water, discharge and circulating piping of urns spaced away from same, a stem in the valve body adapted to control the said orifices, whereby the steam from one urn can flow through one set of orifices of the valve to fill the magazine at the inlet opening thereof while another set of orifices permits the steam to pass out of the magazine into another urn in its first position, and a second position of the valve stem closes off the steam orifices from the magazine but opens up the water line to allow the magazine to fill as the steam condenses and creates a vacuum therein until a predetermined amount of water fills the magazine, followed by a third position of the valve stem with regard to the orifices that allows the steam to enter the magazine and force the water out through the valve into the second mentioned urn; and another position of the valve and stem in relation to the opening and closing of the orifices thereof for allowing the infused water to flow out of the second urn back through the valve into the magazine and under the influence of the vacuum in the same, and another position of the valve for flowing the infused water back through the urn.

2. A measuring unit of the class described comprising in combination, a magazine body of hollow cylindrical construction with outlet and inlet openings therein with a piping extending through to a point adjacent the top thereof, a valve body having a longitudinal passage therethrough and attached to the magazine having a plurality of orifices leading off from the said passage and aligning with said openings and in connection therewith, and other orifices for connection to the steam, water, discharge and circulating piping of urns spaced away from same in predetermined relation thereto, a cylindrically formed stem disposed in the passage in the valve body adapted with material and passages to control the said orifices, whereby the steam from one urn can flow through one set of orifices of the valve to fill the magazine at the inlet opening thereof while another set of orifices permits the steam to pass out of the magazine into another urn in its first position, and a second position of the valve stem closes off the steam orifices from the magazine but opens up the water line to allow the magazine to fill as the steam condenses and creates a vacuum therein until a predetermined amount of water fills the magazine, followed by a third position of the valve stem with regard to the orifices that allows the steam to enter the magazine and force the water out through the valve into the second mentioned urn; and another position of the valve and stem in relation to the opening and closing of the orifices thereof for allowing the infused water to flow out of the second urn back through the valve into the magazine and under the influence of the vacuum in the same, and another position of the valve for flowing the infused water back through the urn; a handle for manipulating the stem, and means for resiliently holding the stem in the body in a predetermined position, said valve being arranged to operate under the manipulation of the handle to permit the interflow of steam and water through the orifices and passages thereof intermingling same within the valve body from the said piping, substantially as described.

RALPH JOSEPH GAVIN.
FRANK ALPHONSE DEVINE.